(12) United States Patent
Engquist et al.

(10) Patent No.: US 10,346,143 B2
(45) Date of Patent: Jul. 9, 2019

(54) SYSTEMS AND METHODS FOR TRANSFORMING SERVICE DEFINITIONS IN A MULTI-SERVICE CONTAINERIZED APPLICATION

(71) Applicant: CA, Inc., Islandia, NY (US)

(72) Inventors: James Douglas Engquist, Islandia, NY (US); Mark Emeis, Islandia, NY (US); Dann M. Church, Islandia, NY (US); Bob Hendrich, Islandia, NY (US); Craig Vosburgh, Islandia, NY (US); Prabodh Joshi, Islandia, NY (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 15/629,202

(22) Filed: Jun. 21, 2017

(65) Prior Publication Data
US 2018/0373505 A1    Dec. 27, 2018

(51) Int. Cl.
*G06F 9/44*    (2018.01)
*G06F 8/40*    (2018.01)
*G06F 8/30*    (2018.01)
*G06F 8/60*    (2018.01)
*G06F 8/71*    (2018.01)
*G06F 8/20*    (2018.01)
(Continued)

(52) U.S. Cl.
CPC .............. *G06F 8/40* (2013.01); *G06F 8/20* (2013.01); *G06F 8/30* (2013.01); *G06F 8/34* (2013.01); *G06F 8/60* (2013.01); *G06F 8/65* (2013.01); *G06F 8/71* (2013.01)

(58) Field of Classification Search
CPC ..... G06F 8/34; G06F 8/33; G06F 8/20; G06F 8/71; G06F 9/4446

USPC ......................................................... 717/113
See application file for complete search history.

(56) References Cited

U.S. PATENT DOCUMENTS 7,127,713 B2 * 10/2006 Davis ................. H04L 63/0227
                                                          717/177
2016/0124742 A1   5/2016 Rangasamy et al.
(Continued)

OTHER PUBLICATIONS

Visually Construct and Maintain Kubernetes and Docket Swarm Apps, yippie.io, Retrieved from the Internet: URL: <https://yipee.io/>, Copyright 2018, 9 pages.

*Primary Examiner* — Chuck O Kendall
(74) *Attorney, Agent, or Firm* — Pillsbury Winthrop Shaw Pittman LLP (57) ABSTRACT

Provided is a method for a method of transforming service definitions in a multi-service containerized application, including: receiving input, with one or more processors, relating to creation and laying out of a plurality of icons on a canvas, wherein the plurality of icons represent a plurality of containers of a multi-service containerized application; receiving input, with one or more processors, relating to at least one pair of the plurality of containers being communicatively coupled with each other, wherein a visual representation of the coupling of the containers is displayed on the canvas in association with corresponding icons; and saving, with one or more processors, the multi-service containerized application with an assigned name to a catalog, wherein the containers are service components of the multi-service containerized application, and wherein the containers provide isolated user space instances on one or more kernels.

20 Claims, 4 Drawing Sheets

(51) Int. Cl.
*G06F 8/34* (2018.01)
*G06F 8/65* (2018.01)

(56) References Cited

U.S. PATENT DOCUMENTS

| | | |
|---|---|---|
| 2017/0126432 A1 | 5/2017 | Padala et al. |
| 2017/0155724 A1 | 6/2017 | Haddad et al. |
| 2017/0279702 A1 | 9/2017 | Mah et al. |
| 2017/0279770 A1 | 9/2017 | Woolward |
| 2017/0285981 A1 | 10/2017 | Dearment |
| 2017/0308793 A1 | 10/2017 | Prismon et al. |
| 2018/0123888 A1 | 5/2018 | Andrews |
| 2018/0349482 A1 | 12/2018 | Oliner et al. |

* cited by examiner

SYSTEMS AND METHODS FOR TRANSFORMING SERVICE DEFINITIONS IN A MULTI-SERVICE CONTAINERIZED APPLICATION

BACKGROUND

1. Field

The present disclosure relates generally to distributed computing, and more specifically, to systems and methods for facilitating transitions between development deployments and production deployments of a multi-service containerized application.

2. Description of the Related Art

Distributed applications are computer applications implemented across multiple hosts. The group of computers, virtual machines, or containers often each execute at least part of the application's code and cooperate to provide the functionality of the application. Examples include client-server architectures, in which a client computer cooperates with a server to provide functionality to a user. Another example is an application having components replicated on multiple computers behind a load balancer to provide functionality at larger scales than a single computer. Some examples have different components on different computers that execute different aspects of the application, such as a database management system, a storage area network, a web server, an application program interface server, and a content management engine.

The different components of such applications often expose functionality via a network address and can be characterized as services, which may be composed of a variety of other services, which may themselves be composed of other services. Examples of a service include an application component (e.g., one or more executing bodies of code) that communicates via a network (or loopback network address) with another application component, often by monitoring a network socket of a port at a network address of the computer upon which the service executes.

Often these services are executed within computational entities that provide a standardized interface to underlying computing hardware and isolate the services on the same computing device from one another. Examples include virtual machines and containers. Interfaces provided by these types of computational entities are often consistent across different types of computing hardware, making it often much easier to add and remove computing resources, transition computing resources between different cloud computing providers, and focus developer effort on the functionality and performance of the application. Further, in many cases these computational entities isolate computing environments from one another within the same computing device, facilitating co-tenancy (e.g., with multiple tenants having different accounts and executing code in different virtual machines) on a single computing device and more freedom to scale and allocate computing resources with granularity.

Often developers design multi-service applications by iteratively coding, deploying, testing, and adjusting the application. In many cases, developers do so in development deployments, in which instances of the various services are executed, and the different instances communicate with one another to provide functionality of the application.

SUMMARY

The following is a non-exhaustive listing of some aspects of the present techniques. These and other aspects are described in the following disclosure.

Some aspects include a method of transforming service definitions in a multi-service containerized application, including: receiving input, with one or more processors, relating to creation and laying out of a plurality of icons on a canvas, wherein the plurality of icons represent a plurality of containers of a multi-service containerized application; receiving input, with one or more processors, relating to at least one pair of the plurality of containers being communicatively coupled with each other, wherein a visual representation of the coupling of the containers is displayed on the canvas in association with corresponding icons; and saving, with one or more processors, the multi-service containerized application with an assigned name to a catalog, wherein the containers are service components of the multi-service containerized application, and wherein the containers provide isolated user space instances on one or more kernels.

Some aspects include a tangible, non-transitory, machine-readable medium storing instructions that when executed by a data processing apparatus cause the data processing apparatus to perform operations including the above-mentioned process.

Some aspects include a method of transforming service definitions in a multi-service containerized application, including: obtaining, with one or more processors, a first record describing a multi-service containerized application, the record identifying a plurality of different services of the multi-service containerized application, containers in which the different services are to be executed, and indicating how the different services are to communicate with one another, wherein the containers provide isolated user space instances on one or more kernels; modifying, with one or more processors, the first record with an annotation associated with a first service among the plurality of different services, the annotation being configured to indicate the first service is a simulated version of the first service or is a version of the first service executed external to a container of the multi-service containerized application; exporting, with one or more processors, the first record to a second record formatted for ingest by an orchestration tool configured to orchestrate execution of the multi-service containerized application, wherein exporting includes: parsing the modified first record; detecting the annotation associated with the first service; and in response to detecting the annotation, creating, with one or more processors, a service definition of the first service in the second record that substitutes a containerized instance of the first service for the simulated version of the first service or the version of the first service executed external to a container of the containerized application; and storing, with one or more processors, the second record in memory.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of distributed application development tooling. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Often development deployments of multi-service applications are different from production deployments (or other development deployments). At certain (often earlier) stages of application development and testing, developers may substitute external, virtual, or native application components for the services they intend to use in the production deployment. (Examples of each are described in greater detail below.) One consequence of this substitution is that transitions between deployments (e.g., where a collection of containers are orchestrated and instances of the various services are executed in the containers) can become complicated and unwieldly, as the instructions by which the application is deployed often can be challenging to correctly modify to transition between the different types of deployments. To realize such alternative service deployments manually can be fragile, complex, and time-consuming.

Some embodiments mitigate difficulties for users (e.g., developers or operations engineers) when replacing one or more services in a multi-service application (e.g., in instructions by which such an application is deployed) with an external, virtual, or native component in multi-service distributed applications. That said, embodiments are not limited to systems that afford all of these benefits, or fully eliminate all such challenges, as multiple, independently useful techniques are described with different cost and engineering tradeoffs, and some embodiments address other problems discussed herein or that will be apparent to one of skill in the art, which is not to suggest that any other description is limiting.

Some embodiments use and modify composition records in which multi-service containerized applications are specified for orchestration tools. Examples of such composition records include compose files that direct the operation of Docker™ Compose. Compose is a container-management tool for defining and running multi-container Docker applications. With Compose, in some implementations, a user can use a compose file as input to an orchestrator command (such as 'docker-compose' or 'docker-stack-deploy') in order to configure services, networks, and volumes by which a multi-container application is launched and scaled. These can be started when the application is started, in some cases automatically, through a process referred to as orchestration. Or some embodiments may modify composition records formatted for other orchestration configuration tools, like Kubernetes™, AWS CloudFormation™, and Google Cloud Deployment Manager™. In some cases, compose files are edited and created with a creation application (e.g., Yipee-io™ available from CA, Inc., of Islandia, N.Y.), for instance, a creation application configured to provide a diagrammatic programming interface for composition records.

Some embodiments provide systems and methods that may be useful in development environments where it is desirable to substitute a mock (i.e., "virtual") implementation for an application component (e.g., a service) that is not yet complete. Virtual services do not include the full set of functionality of a production version of the service at issue. Virtual services may be executed as additional code within a container for a service that calls the virtual service (e.g., substituting a function call or system call for a network communication between services). Virtual services may be executed on a different host (e.g., in a different container) from a service that calls the virtual service. For instance, virtual services may be configured to respond to all requests with a given response, or response in a menu of responses, without implementing all (or in some cases, any) business logic.

Some embodiments provide systems and methods that may be useful in development environments where it is desirable to substitute use an extant "external" database (DB) server (or other component) rather than creating a containerized instance of a database within (i.e., one created upon deployment of the multi-service application) the containerized application. A component (e.g., a service instance) is external (relative to a multi-service application at issue) if it is instantiated before, or without regard to, deployment of the multi-service application at issue. In contrast, services instantiated by an orchestration tool deploying a multi-service application are internal.

Some embodiments provide systems and methods that may be useful in development environments where a developer (or other user) desires to run a native application that implements the functionality of a component rather than creating a containerized instance of that component. In some embodiments, the native application may execute outside of a container engine, e.g., outside of a container, or the native application may execute within a container that is shared by other processes that are not instantiated by an orchestration tool deploying the multi-service application. In some embodiments, the native application may be a monolithic application accessed via system calls in an operating system, e.g., without a calling service sending the request over a network.

In some embodiments, these (or other) types of substitute application components may be combined, e.g., a component may be virtual and external; virtual and native; external and native; or virtual, external, and native.

In some embodiments, these techniques may be implemented in a computing environment 10 (e.g., including each of the illustrated components) shown in FIG. 1 by executing processes described below with reference to FIG. 3 upon computing devices like those described below with reference to FIG. 4. In some embodiments, the computing environment 10 may include a plurality of computing devices 14, a composition file repository 18, a container manager 20, an image repository 22, and a composition file editor 23. These components may communicate with one another via a network 21, such as the Internet and various other local area networks. In some embodiments, the composition file editor 23 is configured to perform the processes of FIG. 3 or other processes. In some embodiments, the composition file editor 23 is a creation application. In some embodiments, the composition file editor 23 executes independently of a creation application. In some embodiments, each of the illustrated components may execute on a single computing device, or different illustrated components may execute on different computing devices (e.g., devices 14 may be different from a developer computing device that executes components 23, 22, 20, and 18).

In some embodiments, the computing environment 10 may execute a plurality of different distributed applications, in some cases intermingling components of these distributed applications on the same computing devices and, in some cases, with some of the distributed applications providing software tools by which other distributed applications are deployed, monitored, and adjusted. It is helpful to generally discuss these applications before addressing specific components thereof within the computing environment 10. In some cases, such applications may be categorized as workload applications and infrastructure applications. The workload applications may service tasks for which the computing environment is designed and provided, for example, hosting a web-based service, providing an enterprise resource management application, providing a customer-relationship management application, providing a document management application, providing an email service, or providing an industrial controls application, just to name a few examples. In contrast, infrastructure applications may exist to facilitate operation of the workload application. Examples include monitoring applications, logging applications, container management applications, and the like.

In some embodiments, the computing devices 14 may execute a (workload or infrastructure) distributed application that is implemented through a collection of services that communicate with one another via the network 21. Examples of such services include a web server that interfaces with a web browser executing on a client computing device via network 21, an application controller that maps requests received via the web server to collections of responsive functional actions, a database management service that reads or writes records responsive to commands from the application controller, and a view generator that dynamically composes webpages for the web server to return to the user computing device. Some examples have different components on different computers that execute different aspects of the application, such as a database management system, a storage area network, a web server, an application program interface server, and a content management engine. Other examples include services that pertain to other application program interfaces, like services that process data reported by industrial equipment or Internet of things (IoT) appliances. Often, the number of services is expected to be relatively large, particularly in multi-container applications implementing a micro-services architecture, where functionality is separated into relatively fine-grained services of a relatively high number, for instance more than 10, more than 20, or more than 100 different micro-services. In some cases, there may be multiple instances of some of the services, for instance behind load balancers, to accommodate relatively high computing loads, and in some cases, each of those instances may execute within different containers on the computing devices as described below. These applications can be characterized as a service composed of a variety of other services, which may themselves be composed of other services. Services composed of other services generally form a service hierarchy (e.g., a service tree) that terminates in leaf nodes composed of computing hardware each executing a given low-level service. In some cases, a given node of this tree may be present in multiple trees for multiple root services.

As multi-container applications or other distributed applications have grown more complex in recent years, and the scale of computing loads has grown, many distributed applications have been designed (or redesigned) to use more, and more diverse, services. Functionality that might have previously been implemented within a single thread on a single computing device (e.g., as different sub-routines in a given executable) may be broken-up into distinct services that communicate via a network interface, rather than by function calls within a given thread. Services in relatively granular architectures are sometimes referred to as a "micro-services." These micro-service architectures afford a number of benefits, including ease of scaling to larger systems by instantiating new components, making it easier for developers to reason about complex systems, and increased reuse of code across applications.

Each service may be a different program or instance of a program executing on one or more computing devices. Thus, unlike different methods or subroutines within a program, the services in some cases do not communicate with one another through shared program states in a region of memory assigned to the program by an operating system on a single computer and shared by the different methods or subroutines (e.g., by function calls within a single program). Rather, the different services may communicate with one another through network interfaces, for instance, by messaging one another with application program interface (API) commands (having in some cases parameters applicable to the commands) sent to ports and network addresses associated with the respective services (or intervening load balancers), for example, by a local domain-name service configured to provide service discovery. In some cases, each port and network address pair refers to a different host, such as a different computing device, from that of a calling service. In some cases, the network address is a loopback address referring to the same computing device.

In some cases, each of the services may include a server (e.g., an executed process) that monitors a network address and port associated with the service (e.g., an instance of a service with a plurality of instances that provide redundant capacity). In some embodiments, the server (e.g., a server process executing on the computing device) may receive messages, parse the messages for commands and parameters, and call appropriate routines to service the command based on the parameters. In some embodiments, some of the servers may select a routine based on the command and call that routine.

The distributed application may be any of a variety of different types of distributed applications, in some cases implemented in one or more data centers. In some cases, the distributed application is a software-as-a-service (SaaS) application, for instance, accessed via a client-side web browser or via an API. Examples include web-based email, cloud-based office productivity applications, hosted enterprise resource management applications, hosted customer relationship management applications, document management applications, human resources applications, Web services, server-side services for mobile native applications, cloud-based gaming applications, content distribution systems, and the like. In some cases, the illustrated distributed application interfaces with client-side applications, like web browsers via the public Internet, and the distributed application communicates internally via a private network, like a local area network, or via encrypted communication through the public Internet.

Two computing devices 14 are shown, but embodiments may have only one computing device 14 or include many more, for instance, numbering in the dozens, hundreds, or thousands or more. In some embodiments, the computing devices 14 may be rack-mounted computing devices 14 in a data center, for instance, in a public or private cloud data center. In some embodiments, the computing devices 14 may be geographically remote from one another, for instance, in different data centers, and geographically remote from the other components illustrated, or these components may be collocated (or in some cases, all be deployed within a single computer).

In some embodiments, the network 21 includes the public Internet and a plurality of different local area networks, for instance, each within a different respective data center connecting to a plurality of the computing devices 14. In some cases, the various components may connect to one another through the public Internet via an encrypted channel.

In some embodiments, each of the computing devices 14 may execute a variety of different routines specified by installed software, which may include workload application software, securing network traffic flow software, an operating system, etc.

In many cases, the application software is implemented with different application components executing on the different hosts (e.g., computing devices, virtual machines, or containers). In some cases, the different application components may communicate with one another via network messaging, for instance, via a local area network, the Internet, or a loopback network address on a given computing device. In some embodiments, the application components communicate with one another via respective application program interfaces, such as representational state transfer (REST) interfaces, for instance, in a micro-services architecture.

In some embodiments, each application component includes a plurality of routines, for instance, functions, methods, executables, or the like, in some cases configured to call one another. In some cases, the application components are configured to call other application components executing on other hosts, such as on other computing devices, for instance, with an application program interface request(s) including a command and parameters of the command. In some cases, some of the application components may be identical to other application components on other hosts, for instance, those provided for load balancing purposes in order to concurrently service transactions. In some cases, some of the application components may be distinct from one another and serve different purposes, for instance, in different stages of a pipeline in which a transaction is processed by the distributed application. Examples include a web server that receives a request, a controller that composes a query to a database based on the request, a database that services the query and provides a query result, and a view generator that composes instructions for a web browser to render a display responsive to the request to the web server. Often, pipelines in commercial implementations are substantially more complex, for instance, including more than 10 or more than 20 stages, often with load-balancing at the various stages including more than 5 or more than 10 instances configured to service transactions at any given stage. Some embodiments have a hub-and-spoke architecture, rather than a pipeline, or a combination thereof. In some cases, multiple software applications may be distributed across the same collection of computing devices, in some cases sharing some of the same instances of application components, and in some cases having distinct application components that are unshared.

In some embodiments, the various computing devices 14 include a network interface controller (NIC—or simply network interface) 24, a central processing unit (CPU) 26, and memory 28. Examples of these components are described in greater detail below with reference to FIG. 4. Generally, the memory 28 may store a copy of program code that when executed by the CPU 26 gives rise to the software components described herein. In some embodiments, the different software components may communicate with one another or with software components on other computing devices via a network interface 24, such as an Ethernet network interface by which messages are sent over a local area network, like in a data center or between data centers. In some cases, the network interface 24 includes a PHY module configured to send and receive signals on a set of wires or optical cables, a MAC module configured to manage shared access to the medium embodied by the wires, a controller executing firmware that coordinates operations of the network interface, and a pair of first-in-first-out buffers that respectively store network packets being sent or received.

In some embodiments, the various computing devices 14 execute one or more operating systems 30, in some cases with one operating system nested within another, for instance, with one or more virtual machines executing within an underlying base operating system. In some cases, a hypervisor may interface between the virtual machines and the underlying operating system, e.g., by simulating the presence of standardized hardware for software executing within a virtual machine.

In some embodiments, the operating systems 30 include a kernel 32. The kernel may be the first program executed upon booting the operating system. In some embodiments, the kernel may interface between applications executing in the operating system and the underlying hardware, such as the memory 28, the CPU 26, and the network interface 24. In some embodiments, code of the kernel 32 may be stored in a protected area of memory 28 to which other applications executing in the operating system do not have access. In some embodiments, the kernel may provision resources for those other applications and process interrupts indicating user inputs, network inputs, inputs from other software applications, and the like. In some embodiments, the kernel may allocate separate regions of the memory 28 to different user accounts executing within the operating system 30, such as different user spaces, and within those user spaces, the kernel 32 may allocate memory to different applications executed by the corresponding user accounts in the operating system 30.

In some embodiments, the operating system 30, through the kernel 32, may provide operating-system-level virtualization to form multiple isolated user-space instances that appear to an application executing within the respective instances as if the respective instance is an independent computing device. In some embodiments, applications executing within one user-space instance may be prevented from accessing memory allocated to another user-space instance. In some embodiments, filesystems and file system name spaces may be independent between the different user-space instances, such that the same file system path in two different user-space instances may point to different directories or files. In some embodiments, this isolation and the multiple instances may be provided by a container engine 34 that interfaces with the kernel 32 to affect the respective isolated user-space instances.

In some embodiments, each of the user-space instances may be referred to as a container. In the illustrated embodiment several containers are shown, but embodiments are consistent with substantially more, for instance more than 5 or more than 20. In some embodiments, the number of containers may change over time, as additional containers are added or removed. A variety of different types of containers may be used, including containers consistent with the Docker™ standard and containers managed by the Google Kubernetes™ orchestration tooling. Containers may run within a virtual machine or within a non-virtualized operating system, but generally containers are distinct from these computational entities. Often, virtual machines emulate the hardware that the virtualized operating system runs upon and interface between that virtualized hardware and the real underlying hardware. In contrast, containers may operate without emulating the full suite of hardware, or in some cases, any of the hardware in which the container is executed. As a result, containers often use less computational resources than virtual machines, and a single computing device may run more than four times as many containers as virtual machines with a given amount of computing resources.

In some embodiments, multiple containers may share the same Internet Protocol address of the same network interface 24. In some embodiments, messages to or from the different containers may be distinguished by assigning different port numbers to the different messages on the same IP address. In some embodiments, the same port number and the same IP address may be shared by multiple containers. For instance, some embodiments may execute a reverse proxy by which network address translation is used to route messages through the same IP address and port number to or from virtual IP addresses of the corresponding appropriate one of several containers.

In some embodiments, various containers may serve different roles. In some embodiments, each container may have one and only one thread, or sometimes a container may have multiple threads. In some embodiments, the containers may execute application components 37 of a distributed application. In some embodiments, each of the application components 37 corresponds to an instance of one of the above-described services.

In some embodiments, infrastructure applications in the computing environment 10 may be configured to deploy and manage the various distributed applications executing on the computing devices 14. In some cases, this may be referred to as orchestration of the distributed application, which in this case may be a distributed application implemented as a multi-container application in a micro-services architecture or other service-oriented architecture. To this end, in some cases, the container manager 20 (such as an orchestrator) may be configured to deploy and configure containers by which the distributed applications are formed. In some embodiments, the container manager 20 may deploy and configure containers based on a description of the distributed application in a composition file in the composition file repository 18.

The container manager 20, in some embodiments, may be configured to provision containers within a cluster of containers, for instance, by instructing a container engine on a given computing device to retrieve a specified image (like an ISO image or a system image) from the image repository 22 and execute that image, thereby creating a new container. Some embodiments may be configured to schedule the deployment of containers, for instance, according to a policy. Some embodiments may be configured to select the environment in which the provisioned container runs according to various policy stored in memory, for instance, specifying that containers be run within a geographic region, a particular type of computing device, or within distributions thereof (for example, that containers are to be evenly divided between a West Coast and East Coast data center as new containers are added or removed). In other examples, such policies may specify ratios or minimum amounts of computing resources to be dedicated to a container, for instance, a number of containers per CPU, a number of containers per CPU core, a minimum amount of system memory available per container, or the like. Further, some embodiments may be configured to execute scripts that configure applications, for example, based on composition files described below.

Some embodiments of the container manager 20 may further be configured to determine when containers have ceased to operate, are operating at greater than a threshold capacity, or are operating at less than a threshold capacity, and take responsive action, for instance by terminating containers that are underused, re-instantiating containers that have crashed, and adding additional instances of containers that are at greater than a threshold capacity. Some embodiments of the container manager 20 may further be configured to deploy new versions of images of containers, for instance, to rollout updates or revisions to application code. Some embodiments may be configured to roll back to a previous version responsive to a failed version or a user command. In some embodiments, the container manager 20 may facilitate discovery of other services within a multi-container application, for instance, indicating to one service executing in one container where and how to communicate with another service executing in other containers, like indicating to a web server service an Internet Protocol address of a database management service used by the web server service to formulate a response to a webpage request. In some cases, these other services may be on the same computing device and accessed via a loopback address or on other computing devices.

In some embodiments, the composition file repository 18 may contain one or more composition files, each corresponding to a different multi-container application. In some embodiments, the composition file repository includes one or more directories on a computing device executing the container manager 20. In some embodiments, the composition files are Docker Compose™ files, Kubernetes™ deployment files, Puppet™ Manifests, Chef™ recipes, or Juju™ Charms. In some embodiments, the composition file may be a single document in a human readable hierarchical serialization format, such as JavaScript™ object notation (JSON), extensible markup language (XML), or YAML Ain't Markup Language (YAML). In some embodiments, the composition file may indicate a version number, a list of services of the distributed application, and identify one or more volumes. In some embodiments, each of the services may be associated with one or more network ports and volumes associated with those services.

In some embodiments, each of the services may be associated with an image in the image repository 22 that includes the application component and dependencies of the application component, such as libraries called by the application component and frameworks that call the application component within the context of a container. In some embodiments, upon the container manager 20 receiving a command to run a composition file, the container manager may identify the corresponding repositories in the image repository 22 and instruct container engines 34 on one or more of the computing devices 14 to instantiate a container, store the image within the instantiated container, and execute the image to instantiate the corresponding service. In some embodiments, a multi-container application may execute on a single computing device 14 or multiple computing devices 14. In some embodiments, containers and instances of services may be dynamically scaled, adding or removing containers and corresponding services as needed.

In some embodiments, a composition file editor 23 may execute a creation application to create or modify composition files, in some cases providing a visual programming interface, such as a diagrammatic programming interface. The creation application may infer the appropriate user interface arrangement based on micro-service container dependency relationships. Various UI elements, such as directional arrows or other visual elements connecting icons representing micro-services in the application, may provide visual feedback indicative of the current application configuration state and be associated with event handlers by which inputs may be processed to modify the application configuration state to reflect the user's traffic-flow intent. For more control, a list of allowed traffic that can be configured in the UI is used in some embodiments. These UI inputs may be processed locally or sent to a remote server that causes a thin client (e.g., web page of an SaaS application) to be presented on a client computing device. This is expected to allow the user to continue to model their application in a way that focuses more naturally on the overall relationships between the micro-services in their application. Having the simplicity of an intuitive UI based configuration (which may be inferred from a user's application configuration) is expected to facilitate use of containerized environments while reducing the developers cognitive load. In other examples, an extant composition record may be parsed and modified with the techniques described herein, for example, editing the extant record or creating a new version of the record.

The present techniques are described with reference to containers, but it should be emphasized that the present techniques may be applied to other computational entities, such as virtual machines and micro-kernels, which is not to suggest that other descriptions are limiting.

Figure 1:
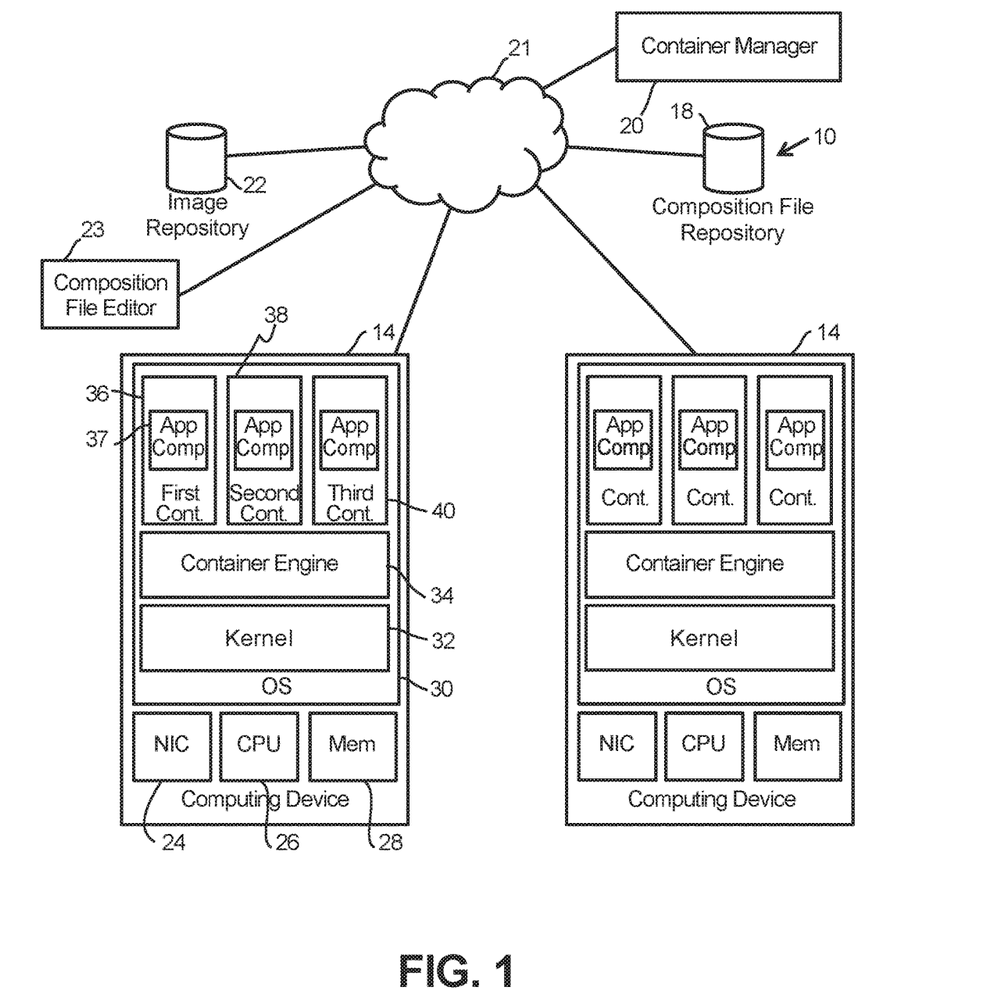
FIG. 1 shows an example of a computing environment configured to transform service definitions in a multi-service containerized application, in accordance with some embodiments.

FIG. 1 shows a first container 36, a second container 38, and a third container 40 including application components 37. However, there may be fewer containers or many more containers. Commercial deployments are executed to include substantially more, e.g., more than five computing devices and more than ten containers.

In some embodiments, the first container 36, second container 38, and third container 40 are configured to communicate with each other across a virtualized network. In some embodiments, the first container 36, second container 38, and third container 40 are different types of containers (e.g., executing different application components, and in some cases each being Docker™ containers or Kubernetes™ containers).

An example of a configuration record follows:

```
version: '3'
networks:
    backend:
        driver: overlay
volumes:
    # persistent volume for redmine uploads
    redmine_files:
        driver: convoy
    # persistent volume for redmine public
    redmine_public:
        driver: convoy
    # persistent volume for mysql databases
    mysql_data:
services:
    redmine:
        # use redmine:latest image from docker hub
        image: bday4-4:5000/redmine:1.0
        build: redmine
        # setup redmine environment
        # see https://hub.docker.com/_/redmine/
        environment:
            - REDMINE_DB_MYSQL=bday_db
            - REDMINE_DB_USERNAME=redmine
            - REDMINE_DB_PASSWORD=r3dmin3
        depends on:
            - db
        # use persinstent volume for file uploads
        # make public folder accessable for nginx
        volumes:
            - redmine_files:/usr/src/redmine/files
            - redmine_public:/usr/src/redmine/public
        networks:
            - backend
        deploy:
            replicas: 1
            update_config:
                parallelism: 2
                delay: 10s
            restart_policy:
                condition: on-failure
        healthcheck:
            test: ["CMD-SHELL", "curl -f http://localhost:3000/ || exit 1"]
            interval: 1m
            timeout: 10s
            retries: 3
    nginx:
        # build nginx with Dockerfile in ./nginx
        # see https://hub.docker.com/_/nginx/
        image: bday4-4:5000/nginx:1.0
        build: nginx
        # map localhost:80 to nginx:80
        ports:
            - 80:80
        depends_on:
            - redmine
        # access public volume from redmine
        volumes:
            - redmine_public:/usr/src/redmine/public
        networks:
            - backend
        depends_on:
            - redmine
        deploy:
            mode: global
            #replicas: 3
            update_contig:
                parallelism: 2
                delay: 10s
```

-continued

```
        restart_policy:
            condition: on-failure
        healthcheck:
            test: ["CMD-SHELL", "curl -f http://localhost/ || exit 1"]
            interval: 1m
            timeout: 10s
            retries: 3
db:
    # use mysql 5 image from docker hub
    image: birtbday_mysql:1.0
    build: mysql
    # setup mysql environment
    # see https://hub.docker.com/_/mysql/
    environment:
        - MYSQL_ROOT_PASSWORD=s3cr3t
        - MYSQL_DATABASE=redmine
        - MYSQL_USER=redmine
        - MYSQL_PASSWQRD=r3dmin3
    networks:
        - backend
    # use persinstent volume for DBs
    volumes:
        - mysql_data:/var/lib/mysql
    deploy:
        replicas: 1
        placement:
            constraints:
                - node.role == manager
                - node.hostname == bday4-1
    stop_grace_period: 30s
```

Creating this configuration record can be time-consuming and prone to error, particularly when different versions are used between different development or production deployments. Often, there are many technical, semantic, and other rules to follow. Some embodiments according to the present technology mitigate this problem, thus increasing efficiency.

Figure 2:
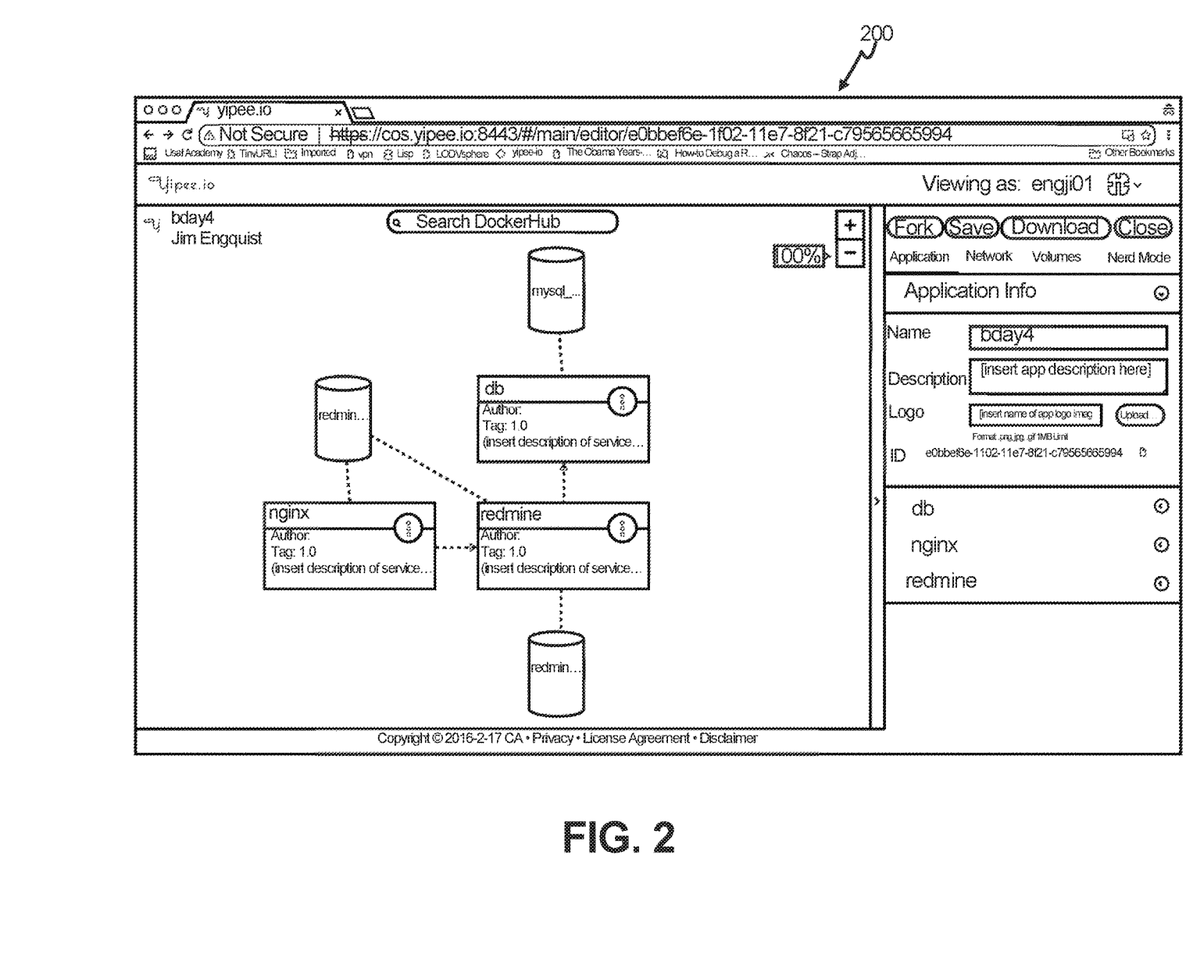
FIG. 2 shows an canvas, in accordance with some embodiments.

FIG. 2 shows a user interface 200 in accordance with some embodiments. This user interface facilitates creating a multi-service containerized application as well as transforming service definitions in the multi-service containerized application. In a drag-and-drop fashion (e.g., with a visual programming language, such as a diagrammatic programming language) or other fashion, various types of icons representing various types of containers may be placed on the user interface (e.g., in a canvas region) and coupled as desired, e.g., the user interface may include event handlers responsive to user inputs, like on-click, on-touch, click-release, or touch-release events. The event handlers may cause the user interface to update to indicate responsive action (e.g., moving an icon representing a container to a different display position, or adding an icon representing a container or connection therebetween) and update a configuration record to encode the corresponding arrangement. For example, three icons representing three storage components (labeled "redmin . . . " or "mysql_ . . . ") are shown. The storage components may be disk storage units, solid-state drives with no disks, or any other suitable types of storage units. An icon representing a container labeled "nginx" is depicted. An icon representing a container labeled "redmine" is depicted. And an icon representing a DB container labeled "db" is shown. Some embodiments of the user interface may include a save button, which upon selection, may save a depicted multi-service containerized application and create the code similar to that shown above (or other appropriate code that is applicable to the icon layout). Some embodiments may include a download button, which may cause the configuration file editor to download an instance of a configuration record, e.g., from composition file repository 18 or another location. The user interface representation of the multi-service containerized application may, thus, include information about individual services of an application being edited.

In some cases, a user may configure a multi-service application in the illustrated user interface with an architecture suitable for running in a production deployment, but not want to test that full production deployment. As noted, in some cases, a user may run the edited application with one or more service components being virtual, external, or native. Thus, a user may wish to concurrently design both a production version and a development version of a multi-service application.

In some embodiments, annotations are added to service definitions in a creation application, the creation application being an application configured to create and layout the icons on the user interface 200 (e.g., a canvas or canvas region) and then transform that visual representation into a configuration record suitable for ingest by an orchestration tool that can deploy the application. In some embodiments, a user may designate in the user interface of FIG. 2 (e.g., by right clicking on a component) whether a component is virtual, native, or external. Some embodiments may associate these received designations with a corresponding service. When forming a composition record from the user-edited design in the user interface, some embodiments of the composition file editor 23 may annotate service definitions (e.g., a composition record, such as one in a format specific to the composition file editor 23, or one specific to the container manager 20). In some cases, absent the annotations, the corresponding composition record may be configured to cause the production (e.g., without virtual, native, or external components) version to be deployed. In some embodiments, the annotations may include attributes, such as a type of the substitution (e.g., external, native, or virtual) and values by which substitutions are configured. Examples include network addresses or domain names of external services, executable paths (e.g., locations in a file system of an OS where an executable is stored) for system calls to native applications, and rules to transform between request/responses to/from a virtual service (e.g., reference to (or encoding of) a list of (port, request, response) tuples).

In some cases, when an annotated model is exported to be run via an orchestration tool, the service definition (as specified but-for the annotation) may be replaced responsive to the annotations. For instance, when a user configures an "external" service, and when deploying a development version of the designed application, the exported definition may cause the orchestration tool to start a HAProxy container (or other proxy, such as other load balancing proxy servers) in place of the service defined but-for the annotation (i.e., the production version encoded by the composition record). Some embodiments may configure the HAProxy container to redirect traffic (sent to what will serve as the replaced service in a production version) to the configured server (IP or DNS name) with the configured connection type ("tcp" or "http") with the configured port mappings (from the original container port to the external service listening port). In some embodiments, the HAProxy server in the container may be configured to edit headers in IP packets and TCP packets to replace recipient fields (e.g., specified by a DNS or other service discovery tool of the deployed application) with those of the external service, e.g., according to a network address translation table configured by some embodiments.

When a user configures a "virtual" service, the exported definition may start a mock http server in place of the originally defined service. The mock server may be configured with a list of (port, request, response) tuples. In some cases, the mock server may not implement business logic or other conditional branching beyond selecting among these responses. The mock server may listen on the various configured ports. A given received request may be compared by the server to the list of configured requests. If a match is found, the configured response may be returned by the mock server.

When a user configures a "native" service, the exported definition may omit the original service definition. For instance, some embodiments may delete (e.g., remove or comment-out) the service definition in a configuration file for this service and export that modified configuration record to an orchestration tool. The idea here is that a local instance of this service is already running and the local version will cooperate directly with the other components of the application. Thus, this service need not be started.

Having a definition that contains the data to perform these service transformations is expected to allow multiple developers (or other users) to make the transformations simply, consistently, and in a repeatable fashion when they are needed. This is expected to allow for considerable flexibility in application development, while still keeping the application definition consistent. This is expected to help reduce potential "drift" between development deployments and production deployments. That said, embodiments are not limited to systems that provide these benefits, as multiple independently useful techniques are described with various tradeoffs in design parameters, which is not to suggest that any other description is limiting.

Figure 3:
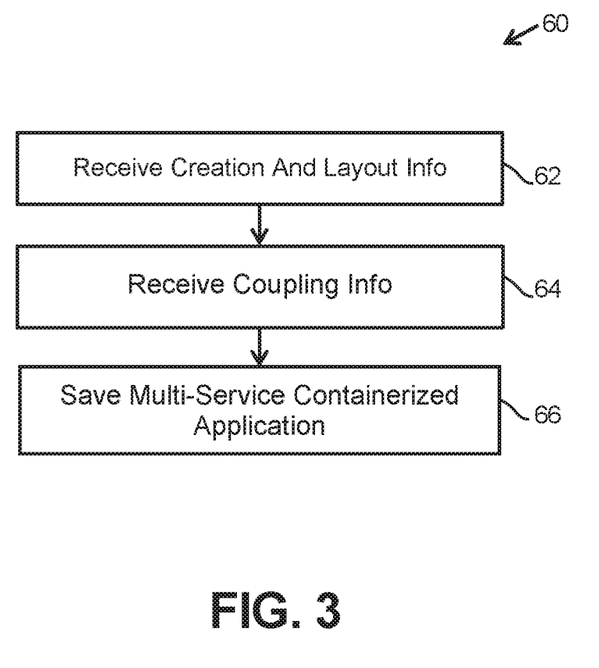
FIG. 3 shows an example of a process by which service definitions are transformed in a multi-service containerized application, in accordance with some embodiments.

In some embodiments, the process 60 of FIG. 3 may be executed by the composition file editor 23 (which may represent a creation application) of FIG. 1, but embodiments are not limited to that implementation, which is not to imply that any other feature is limited to the described implementation. In some embodiments, multiple instances of the process 60 may be executed concurrently, for instance, on different Compose files, in relation to different multi-container applications. In some embodiments, the operations described (in reference to this and the other figures) may be performed in a different order from that recited, in some cases with some operations replicated multiple times, again which is not to imply that other descriptions are limiting. In some embodiments, input may be received related to creation and laying out of one or more icons representing memory storage units on the canvas 200. The memory storage units store application states of the multi-service containerized application for other services of the multi-service containerized application.

FIG. 3 shows an example of a process by which service definitions are transformed in a multi-service containerized application, in accordance with some embodiments. Some embodiments include receiving input, with one or more processors, relating to creation and laying out of a plurality of icons on a canvas 200, wherein the plurality of icons represent a plurality of containers of a multi-service containerized application, as indicated by block 62. A computer device may be instructed (e.g., locally, or by sending instructions to a remote client device, like one executing a web browser in which the user interface is displayed) to present a user interface of a diagrammatic programming environment, which may include creating a canvas element on the user interface 200 in which icons are arranged representing containers that are part of the application and showing how the containers are communicatively coupled with each other. The canvas may be, for example, an html5 canvas; however, it is not limited to such elements, which is not to suggest that other descriptions are limiting.

Instructing a computing device may include sending instructions to a client computing device to present a user interface (e.g., sending web markup and scripts) or executing instructions on the computing device that cause the user interface to be defined and rendered (e.g., in a native application). Some embodiments may obtain the record upon receiving a request to export the composition record in a format suitable for an orchestration tool. In some cases, the composition record may be a Docker Compose™ file or one of the other examples described above. Obtaining may include retrieving the composition file in the form of a human readable hierarchical serialization data format text file (e.g., YAML, JSON, or XML), or the composition record may be obtained in a different format, for instance, upon parsing such a file and loading the attributes thereof into a data structure in memory, like a set of objects in an object-oriented programming environment.

Next, some embodiments include receiving input, with one or more processors, relating to at least one pair of the plurality of containers being communicatively coupled with each other, wherein a visual representation of the coupling of the containers is displayed on the canvas 200 in association with corresponding icons, as indicated by block 64.

Next, some embodiments include saving, with one or more processors, the multi-service containerized application with an assigned name to a catalog, wherein the containers are service components of the multi-service containerized application, and wherein the containers provide isolated user space instances on one or more kernels, as indicated by block 66.

In some embodiments, creating and laying out icons representing containers on the user interface includes creating and laying out icons representing one or more of a database container, a webserver container, or a business-logic container. The saved multi-service containerized application may be retrieved from the catalog and a representation of the multi-service containerized application presented on the user interface. Upon receipt of a download command, a text file representing the multi-service containerized application that was saved may be produced, in addition to the graphical representation of icons. The text file may be a runnable representation of the multi-service containerized application that was saved (which is not to suggest that all resources needed to deploy the application (like images of containers) are contained therein, or that any other description is limiting). The runnable representation of the multi-service containerized application that was saved may be started up if desired. In some embodiments, one or more containers in the multi-service containerized application may be replaced with a virtual implementation of a service component that is not yet complete. One or more containers in the multi-service containerized application may be replaced with a virtual implementation of a service component that is not yet complete. One or more containers in the multi-service containerized application may be replaced with an external implementation of a service component that is not created on the canvas 200 and saved to the catalog. In some embodiments, rather than implementing a corresponding containerized instance of the database that otherwise has to be created to execute the multi-service containerized application, an extant database is implemented.

One or more containers in the multi-service containerized application may be replaced with a native implementation of a service component that has been saved to the catalog, the native implementation being a non-containerized version of an application that provides a service in the multi-service containerized application. A local copy of the service component may implemented, rather than implementing a containerized instance of a database that otherwise has to be created to execute the multi-service containerized application. In some embodiments, the multi-service containerized application with one or more service components is a virtual mock implementation of a service component of the multi-service containerized application.

In some embodiments, the multi-service containerized application is run with one or more service components being an external implementation of a service component that is not local and already exists outside the catalog and does not need to be saved to the catalog to specify how to orchestrate the multi-service containerized application. In some embodiments, the multi-service containerized application is run with one or more service components being a native implementation of a service component that is local to a computing device testing or developing the multi-service containerized application and has been created on the canvas and saved to the catalog. Thus, a method is provided by which a user of a creation application may replace one or more services in a multi-service containerized application with external, native, or virtual components.

Figure 4:
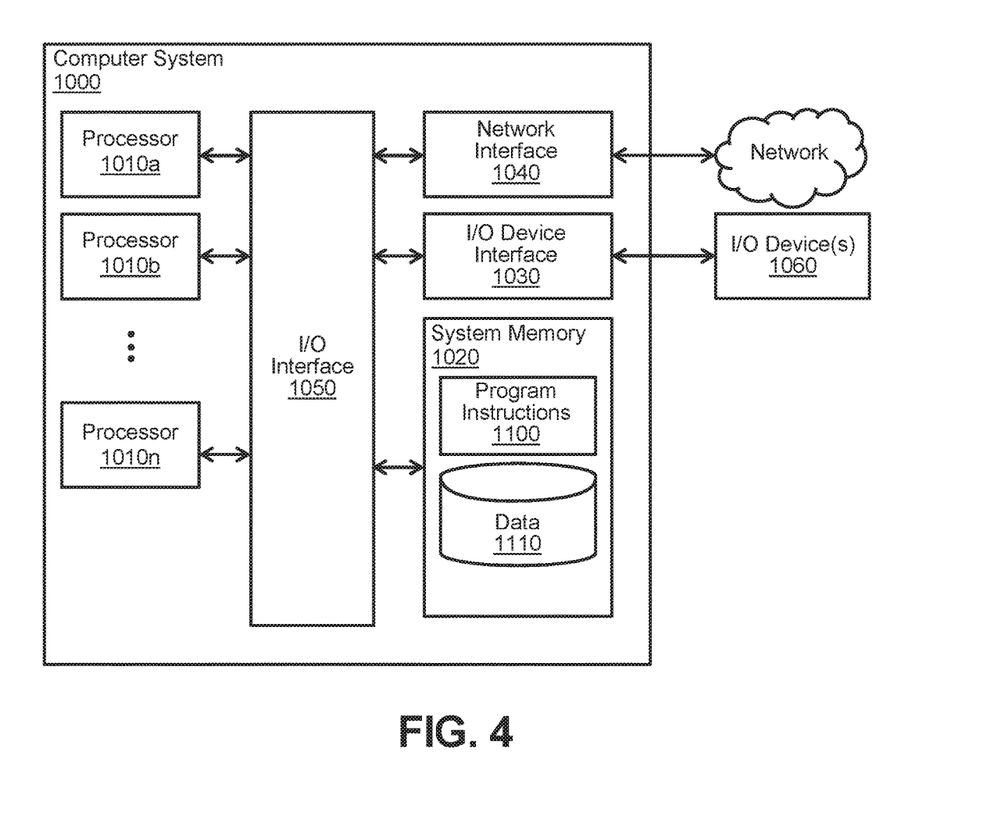
FIG. 4 shows an example of a computing device by which the above systems and processes may be implemented, in accordance with some embodiments.

FIG. 4 is a diagram that illustrates an exemplary computing system (also referred to as a computing device or computer) 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A method for transforming service definitions in a multi-service containerized application, the method comprising:
    receiving input, with one or more processors, relating to creation and laying out of a plurality of icons on a canvas, wherein the plurality of icons represent a plurality of containers of a multi-service containerized application;
    receiving input, with one or more processors, relating to at least one pair of the plurality of containers being communicatively coupled with each other, wherein a visual representation of the coupling of the containers is displayed on the canvas in association with corresponding icons; and
    saving, with one or more processors, the multi-service containerized application with an assigned name to a catalog, wherein the containers are service components of the multi-service containerized application, and wherein the containers provide isolated user space instances on one or more kernels.

2. The method of embodiment 1, wherein creating and laying out icons representing containers on the canvas comprises creating and laying out icons representing one or more of a database container, a webserver container, or an application container.

3. The method of any one of embodiments 1-2, further comprising causing, with one or more processors, the saved multi-service containerized application to be retrieved from the catalog and a representation of the multi-service containerized application to be presented on the canvas.

4. The method of any one of embodiments 1-3, further comprising producing, with one or more processors, upon receipt of a download command, a text file representing the multi-service containerized application that was saved.

5. The method of any one of embodiments 1-4, wherein the text file is a runnable representation of the multi-service containerized application that was saved.

6. The method of any one of embodiments 1-5, further comprising starting up, with one or more processors, the runnable representation of the multi-service containerized application that was saved.

7. The method of any one of embodiments 1-6, further comprising replacing, with one or more processors, one or more containers in the multi-service containerized application with a virtual implementation of a service component that is not yet complete.

8. The method of any one of embodiments 1-7, further comprising replacing, with one or more processors, one or more containers in the multi-service containerized application with an external implementation of a service component that is not created on the canvas and saved to the catalog.

9. The method of any one of embodiments 1-8, wherein an extant database is implemented, with one or more processors, rather than implementing a corresponding containerized instance of the database that otherwise has to be created to execute the multi-service containerized application.

10. The method of any one of embodiments 1-9, further comprising replacing, with one or more processors, one or more containers in the multi-service containerized application with a native implementation of a service component that has been saved to the catalog, the native implementation being a non-containerized version of an application that provides a service in the multi-service containerized application.

11. The method of any one of embodiments 1-10, wherein a local copy of the service component is implemented, with one or more processors, rather than implementing a containerized instance of a database that otherwise has to be created to execute the multi-service containerized application.

12. The method of any one of embodiments 1-11, further comprising running, with one or more processors, the multi-service containerized application with one or more service components being a virtual mock implementation of a service component of the multi-service containerized application.

13. The method of any one of embodiments 1-12, further comprising running, with one or more processors, the multi-service containerized application with one or more service components being an external implementation of a service component that is not local and already exists outside the catalog and does not need to be saved to the catalog to specify how to orchestrate the multi-service containerized application.

14. The method of any one of embodiments 1-13, further comprising running, with one or more processors, the multi-service containerized application with one or more service components being a native implementation of a service component that is local to a computing device testing or developing the multi-service containerized application and has been created on the canvas and saved to the catalog.

15. The method of any one of embodiments 1-15, wherein annotation data is added to service definitions in a creation application, the creation application being an application configured to create and layout the icons on the canvas.

16. The method of any one of embodiments 1-15, further comprising receiving input, with one or more processors, related to creation and laying out of one or more icons representing memory storage units on the canvas, the memory storage units storing application states of the multi-service containerized application for other services of the multi-service containerized application.

17. A tangible, non-transitory, machine-readable medium storing instructions that when executed by a data processing apparatus cause the data processing apparatus to perform operations comprising: the operations of any of embodiments 1-16.

What is claimed is:

1. A method of transforming service definitions in a multi-service containerized application, the method comprising:

receiving input, with one or more processors, relating to creation and laying out of a plurality of icons on a canvas, wherein the plurality of icons represent a plurality of containers of a multi-service containerized application;

receiving input, with one or more processors, relating to at least one pair of the plurality of containers being communicatively coupled with each other, wherein a visual representation of the coupling of the containers is displayed on the canvas in association with corresponding icons; and saving, with one or more processors, the multi-service containerized application with an assigned name to a catalog, wherein the containers are service components of the multi-service containerized application, and wherein the containers provide isolated user space instances on one or more kernels.

2. The method of claim 1, wherein creating and laying out icons representing containers on the canvas comprises creating and laying out icons representing one or more of a database container, a webserver container, or an application container.

3. The method of claim 1, further comprising causing, with one or more processors, the saved multi-service containerized application to be retrieved from the catalog and a representation of the multi-service containerized application to be presented on the canvas.

4. The method of claim 3, further comprising producing, with one or more processors, upon receipt of a download command, a text file representing the multi-service containerized application that was saved.

5. The method of claim 4, wherein the text file is a runnable representation of the multi-service containerized application that was saved.

6. The method of claim 5, further comprising starting up, with one or more processors, the runnable representation of the multi-service containerized application that was saved.

7. The method of claim 1, further comprising replacing, with one or more processors, one or more containers in the multi-service containerized application with a virtual implementation of a service component that is not yet complete.

8. The method of claim 1, further comprising replacing, with one or more processors, one or more containers in the multi-service containerized application with an external implementation of a service component that is not created on the canvas and saved to the catalog.

9. The method of claim 8, wherein an extant database is implemented, with one or more processors, rather than implementing a corresponding containerized instance of the database that otherwise has to be created to execute the multi-service containerized application.

10. The method of claim 1, further comprising replacing, with one or more processors, one or more containers in the multi-service containerized application with a native implementation of a service component that has been saved to the catalog, the native implementation being a non-containerized version of an application that provides a service in the multi-service containerized application.

11. The method of claim 10, wherein a local copy of the service component is implemented, with one or more processors, rather than implementing a containerized instance of a database that otherwise has to be created to execute the multi-service containerized application.

12. The method of claim 1, further comprising running, with one or more processors, the multi-service containerized application with one or more service components being a virtual mock implementation of a service component of the multi-service containerized application.

13. The method of claim 1, further comprising running, with one or more processors, the multi-service containerized application with one or more service components being an external implementation of a service component that is not local and already exists outside the catalog and does not need to be saved to the catalog to specify how to orchestrate the multi-service containerized application.

14. The method of claim 1, further comprising running, with one or more processors, the multi-service containerized application with one or more service components being a native implementation of a service component that is local to a computing device testing or developing the multi-service containerized application and has been created on the canvas and saved to the catalog.

15. The method of claim 1, wherein annotation data is added to service definitions in a creation application, the creation application being an application configured to create and layout the icons on the canvas.

16. The method of claim 1, further comprising receiving input, with one or more processors, related to creation and laying out of one or more icons representing memory storage units on the canvas, the memory storage units storing application states of the multi-service containerized application for other services of the multi-service containerized application.

17. A tangible, non-transitory, machine-readable medium storing instructions that when executed by one or more computers effectuate operations comprising:
   receiving input, with one or more processors, relating to creation and laying out of a plurality of icons on a canvas, wherein the plurality of icons represent a plurality of containers of a multi-service containerized application;
   receiving input, with one or more processors, relating to at least one pair of the plurality of containers being communicatively coupled with each other, wherein a visual representation of the coupling of the containers is displayed on the canvas in association with corresponding icons; and
   saving, with one or more processors, the multi-service containerized application with an assigned name to a catalog, wherein the containers are service components of the multi-service containerized application, and wherein the containers provide isolated user space instances on one or more kernels.

18. The medium of claim 17, wherein creating and laying out icons representing containers on the canvas comprises creating and laying out icons representing one or more of a database container, a webserver container, or an application container.

19. The medium of claim 17, further comprising causing, with one or more processors, the saved multi-service containerized application to be retrieved from the catalog and a representation of the multi-service containerized application to be presented on the canvas.

20. A method of transforming service definitions in a multi-service containerized application, the method comprising:
   obtaining, with one or more processors, a first record describing a multi-service containerized application, the record identifying a plurality of different services of the multi-service containerized application, containers in which the different services are to be executed, and indicating how the different services are to communicate with one another, wherein the containers provide isolated user space instances on one or more kernels;
   modifying, with one or more processors, the first record with an annotation associated with a first service among the plurality of different services, the annotation being configured to indicate the first service is a simulated version of the first service or is a version of the first service executed external to a container of the multi-service containerized application;
   exporting, with one or more processors, the first record to a second record formatted for ingest by an orchestration tool configured to orchestrate execution of the multi-service containerized application, wherein exporting comprises:
   parsing the modified first record;
   detecting the annotation associated with the first service; and
   in response to detecting the annotation, creating, with one or more processors, a service definition of the first service in the second record that substitutes a containerized instance of the first service for the simulated version of the first service or the version of the first service executed external to a container of the containerized application; and
   storing, with one or more processors, the second record in memory.

* * * * *